United States Patent [19]
Humpherson

[11] Patent Number: 5,529,458
[45] Date of Patent: Jun. 25, 1996

[54] CIRCULATION CONTROL AEROFOILS

[75] Inventor: David V. Humpherson, Chiselborough, England

[73] Assignee: Westland Helicopters Limited, Yeovil, England

[21] Appl. No.: 291,089

[22] Filed: Aug. 18, 1994

[30] Foreign Application Priority Data

Aug. 19, 1993 [GB] United Kingdom .................... 9317294

[51] Int. Cl.[6] .................................................... F04D 29/18
[52] U.S. Cl. .................. 416/20 R; 416/90 R; 244/75 R; 244/219
[58] Field of Search ....................... 416/20, 90; 244/219, 244/75 R, 215, 213; 310/330

[56] References Cited

U.S. PATENT DOCUMENTS

| | | |
|---|---|---|
| 3,139,936 | 7/1964 | Davidson et al. . |
| 3,524,711 | 4/1970 | Cheeseman et al. . |
| 3,670,994 | 6/1972 | Kizilos .................................. 416/90 A |
| 4,131,990 | 12/1978 | Schmidt ................................ 416/90 A |
| 4,137,008 | 1/1979 | Grant et al. ........................... 416/90 A |
| 4,655,685 | 4/1987 | Fradenburgh ......................... 416/90 A |
| 4,799,859 | 1/1989 | Zimmer . |
| 4,812,698 | 3/1989 | Chida et al. ............................. 310/330 |
| 4,966,526 | 10/1990 | Amelio et al. . |
| 5,224,826 | 7/1993 | Hall et al. . |

FOREIGN PATENT DOCUMENTS 960657   6/1994   United Kingdom .

Primary Examiner—John T. Kwon
Attorney, Agent, or Firm—Larson & Taylor

[57] ABSTRACT

A circulation control aerofoil having an internal chamber for receiving during operation air for exhaust through a circulation control air exhaust slot defined by spaced-apart slot lips is provided with a plurality of actuators of electrically deformable material adapted during operation to cause local bending of the aerofoil structure to which they are attached to selectively adjust the width of the air exhaust slot. The actuators may be piezo-electric actuators.

7 Claims, 2 Drawing Sheets

CIRCULATION CONTROL AEROFOILS

BACKGROUND OF THE INVENTION

1. Field of the Invention

This invention relates to circulation control aerofoils and particularly to such aerofoils for use in the rotor blades of helicopter main sustaining rotors.

2. Description of the Prior Art

In a circulation control helicopter sustaining rotor, pressurised air is supplied through control valve means, usually in a rotor head, to the hollow interior of each of a plurality of rotor blades. The pressurised air is forced out of spanwise extending slots located adjacent the blade trailing edge and sometimes adjacent both the trailing and leading edges.

Circulation control of a helicopter rotor has been proposed principally to vary a blade maximum lift coefficient for thrust control purposes and particularly to increase this coefficient to mitigate the problem of retreating blade stall. In general, a greater amount of blowing airflow is required to be ejected from a retreating blade than from an advancing blade and mechanical control valve means have therefore been proposed to cyclically modulate the amount of ejected airflow to achieve cyclic lift control as the blade rotates around the rotor disc, for the purposes of trim and control, as well as collectively modulating the amount of the ejected airflow to achieve collective control of the rotor thrust normal to the rotor plane.

An example of a prior art mechanical control valve means is disclosed in U.S. Pat. no. 4,799,859. That device is complex, heavy and may be unreliable in operation.

In seeking to maximise the thrust from a helicopter main sustaining rotor (or to minimise the power required to generate a given thrust) it is known that there is an optimum distribution of lift (local lift coefficient) at different stations throughout the blade span. In addition, the optimal radial distribution of lift varies according to the azimuthal position of the rotor blade in the rotor disc, and with the helicopter flight conditions e.g. speed, altitude, manoeuvre etc.

Hence, to maximise the performance of a helicopter sustaining rotor it is, ideally, required to vary the local lift coefficient at different stations along the span of each blade, and as the blade rotates around the rotor disc.

The inventors have realised the potential of circulation control for achieving such a variation of local lift coefficient in a helicopter rotor. However, they realised also that the requirements may not optimally be met using the mechanical control valve arrangements and air distribution techniques of the prior art, since the need to introduce variable spanwise control along individual blades would further complicate such existing complex systems and add to the existing problems.

A primary objective of this invention therefore is to provide a circulation control aerofoil that is simpler and better adapted to use in a helicopter rotor than the prior art. Another objective is to provide such an aerofoil having at least the potential to vary the local lift coefficient at different stations along the aerofoil span.

SUMMARY OF THE INVENTION

Accordingly, in one aspect, this invention provides a circulation control aerofoil having an internal spanwise extending chamber for receiving during operation pressurised air for exhaust through at least one circulation control air exhaust slot extending spanwise along the aerofoil and having a width defined by spaced-apart slot lips, and including a plurality of actuators attached along aerofoil structure adjacent at least one of said slot lips and control means for controlling differentially the individual actuators to selectively adjust the width of the air exhaust slot along the aerofoil span.

Preferably said actuators are constructed of electrically deformable material and the control means is adapted to control an electric supply to the individual actuators whereby energisation of the actuators causes local bending of the aerofoil structure to which they are attached, to effect adjustment of the width of the air exhaust slot. The actuators may be piezo-electric actuators.

The air exhaust slot may be a continuous slot extending substantially throughout the span of the aerofoil and said actuators may be located substantially side-by-side along said aerofoil structure.

The actuators may be located along one surface of the aerofoil structure adjacent one or both of the slot lips. Alternatively, actuators may be located on both external and internal surfaces of the aerofoil structure adjacent one or both of the slot lips.

In another aspect this invention provides a helicopter rotor blade having an internal spanwise extending chamber for receiving during operation pressurised air for exhaust through at least one circulation control air exhaust slot extending spanwise along the blade and having a width defined by spaced-apart slot lips, and including a plurality of piezo-electric actuators attached along rotor blade structure adjacent at least one of the slot lips, and control means for controlling an electric supply to the individual actuators whereby energisation of the actuators causes local bending of the structure to differentially adjust the width of the air exhaust slot along the blade span.

U.S. Pat. No. 5,224,826 discloses the actuation of an aerofoil (e.g. helicopter rotor blade) trailing edge flaps by piezo-electric actuators that may be arranged to provide variable flap deflection along the span of the aerofoil.

BRIEF DESCRIPTION OF THE DRAWINGS

The invention will now be described by way of example only and with reference to the accompanying drawings in which.

DETAILED DESCRIPTION OF THE DRAWINGS

Figure 1:
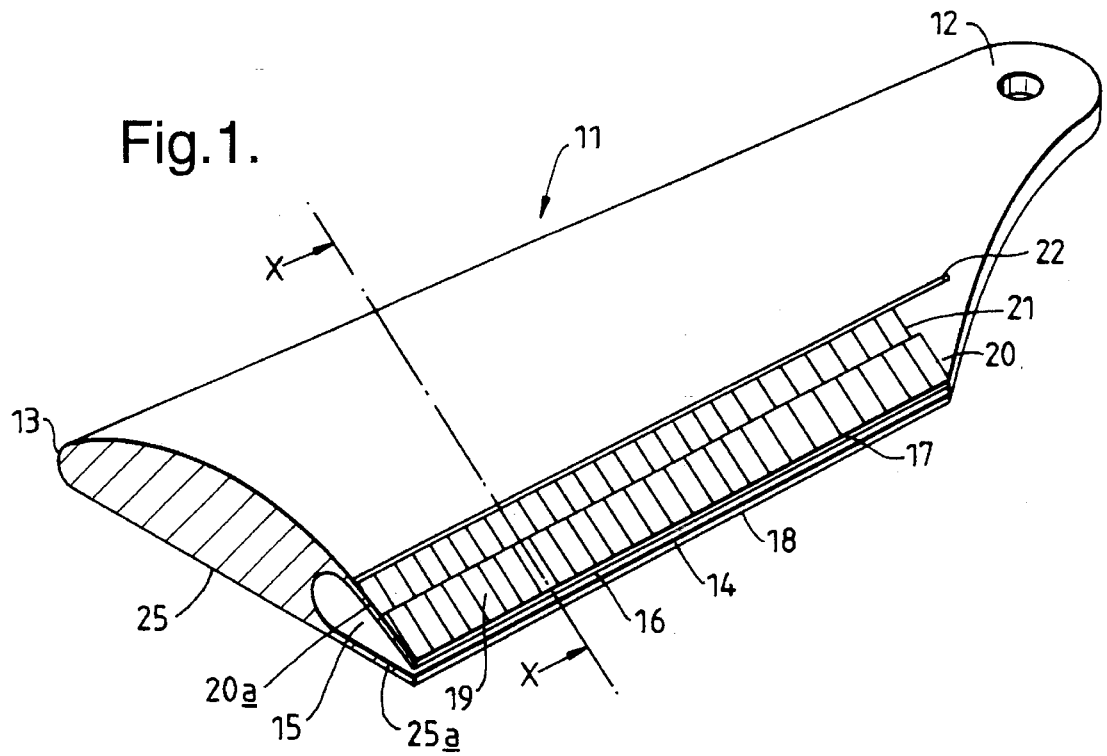
FIG. 1 is a fragmentary perspective illustration of an aerofoil in the form of a rotor blade for a circulation control rotor and constructed according to one embodiment of the invention.

Referring now to FIG. 1, an aerofoil in the form of a rotor blade 11 for a circulation control rotor includes a root end 12 adapted for attachment to a rotor head. The blade 11 has an aerofoil cross section defined between upper and lower surfaces 20 and 25 extending between a leading edge 13 and a trailing edge 14.

The rotor blade 11 includes, adjacent the trailing edge 14, an internal spanwise extending chamber 15 for connection to receive during operation a supply of pressurised air routed through the rotor head from a source carried by the helicopter on which the rotor is fitted. Chamber 15 is defined in part by upper and lower wall structures 20a and 25a and is connected to an air exhaust slot 16 extending longitudinally along the trailing edge 14 of the rotor blade 11 throughout substantially the whole blade span. Air exhaust slot 16 has a width defined by an upper or first lip portion 17 and a spaced-apart lower or second lip portion 18.

A plurality of electrically deformable material actuators 19, preferably piezo-electric actuators, are attached substantially side-by-side to the external surface of upper wall structure 20a of rotor blade 11, and extend generally chordwise from adjacent said first lip portion 17. The individual actuators 19 are connected electrically as indicated at 21 to a control circuit 22 operated by a central computer (not shown) on the helicopter.

Figure 2:
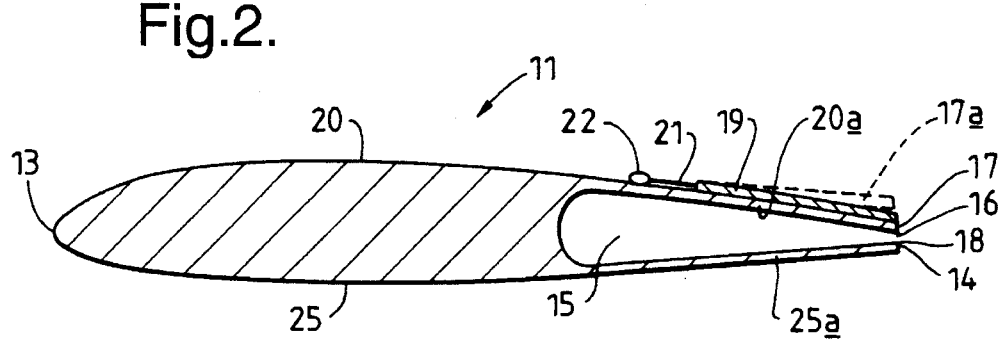
FIG. 2 is a sectioned view taken on lines X—X of FIG. 1.

As indicated in FIG. 2, energisation of the individual piezo-electric actuators 19 induces generally chordwise local bending of upper wall structure 20a of the rotor blade 11, causing movement of the first lip portion 17 as indicated at 17a to enable selective and differential variation of the width of the air exhaust slot 16 at regions distributed along the span of the rotor blade 11 and as it rotates around the rotor operational disc.

The level of blowing from the exhaust slot 16 can be described by the blowing coefficient defined as:

$$\frac{Thrust}{1/2\rho v^2 s} \quad \text{or} \quad \frac{Mv_j}{1/2\rho v^2 s}$$

where

M=air mass flow, $v_j$=jet velocity, $\rho$=air density, v=aerofoil local velocity, and s=aerofoil reference area which may be varied by changing the air mass flow and/or jet velocity by varying the width of slot 16.

This invention provides a simple and effective means of varying the width and therefore the effective area of the air exhaust slot 16 which, in turn, therefore is capable of varying the local blowing coefficient and hence the local circulation and local lift characteristics. Furthermore, the invention provides for such variation differentially along a rotor blade span and azimuthly as the blade rotates around an operational rotor disc. In practice it is difficult to provide a constant supply total pressure along the span of the blade 11, due both to flow effects (e.g. losses) and the varying centrifugal field. With this invention local deviations of blowing coefficient from predicted or required levels can be compensated by an appropriate adjustment of the local slot area by varying the width of slot 16 preferably using a closed loop feedback mechanism.

Similarly, whilst it is possible to determine a theoretical optimum distribution of blowing coefficient both along an individual blade and around the rotor azimuth that will provide maximum efficiency (e.g. maximum thrust to power ratio) and directly control the slot width to obtain this distribution, it is preferable to operate the system through a closed loop control system.

Thus, control of the individual piezo-electric actuators is vested in a central computing system operating, preferably, through a closed loop feedback mechanism. One appropriate form of feedback mechanism operates by measuring the angle of flow upwash incident on the blade leading edge 13 at a spanwise location corresponding to each of the actuators 19, or to a sub-set of adjacent actuators 19, since the upwash provides a good measure of the local circulation and hence of the local lift being generated at any given span location.

Figure 3:
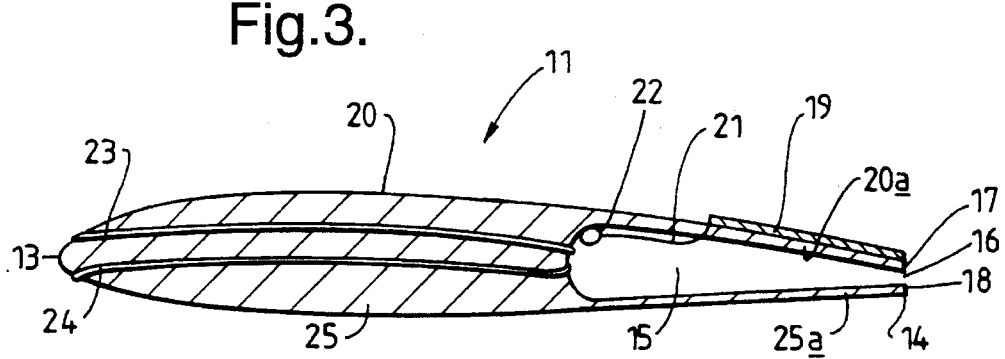
FIG. 3 is a sectioned view similar to FIG. 2 showing a further feature of the invention.

FIG. 3 illustrates one means of obtaining upwash angle information and comprises a pair of pitot static probes 23 and 24 spaced-apart around the leading edge 13 and having signal connections routed through the chamber 15 to the helicopter. The probes provide information on the differential pressure, which can be used to calculate the appropriate upwash angle, as well as the local value of the dynamic head, 'q' (i.e. $\frac{1}{2}\rho^2$). Since the local blade area is known, all the relevant variables are available for computation of the control outputs needed to maintain the actual blade lift distribution close to desired values throughout the blade span.

FIG. 3 also shows a modification in which the electrical connections 21 are routed inwardly through the blade structure adjacent the actuators 19 for connection to the control circuit 22 internally of the chamber 15.

Figure 4:
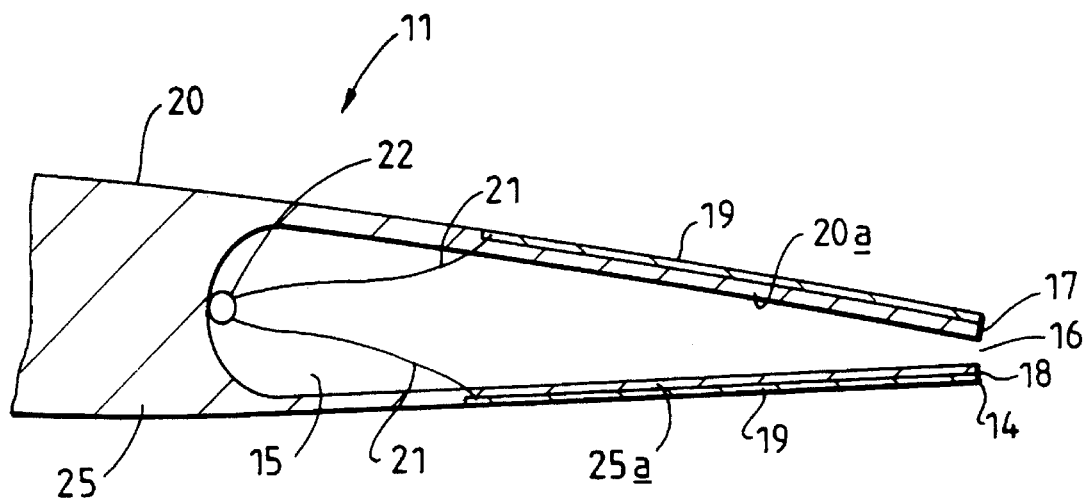
FIG. 4 is a fragmentary sectioned view of a rotor blade illustrating a further embodiment.

In the embodiment of FIG. 4, piezo-electric actuators 19 are located on the external surfaces of both the upper and lower wall structures 20a and 25a, adjacent both the upper and lower lips 17 and 18. The actuators 19 are embedded in the blade structure so as to be flush with the surfaces 20 and 25, such an arrangement being particularly applicable where the rotor blade or aerofoil structure is manufactured from fibre-reinforced composite materials.

Figure 5:
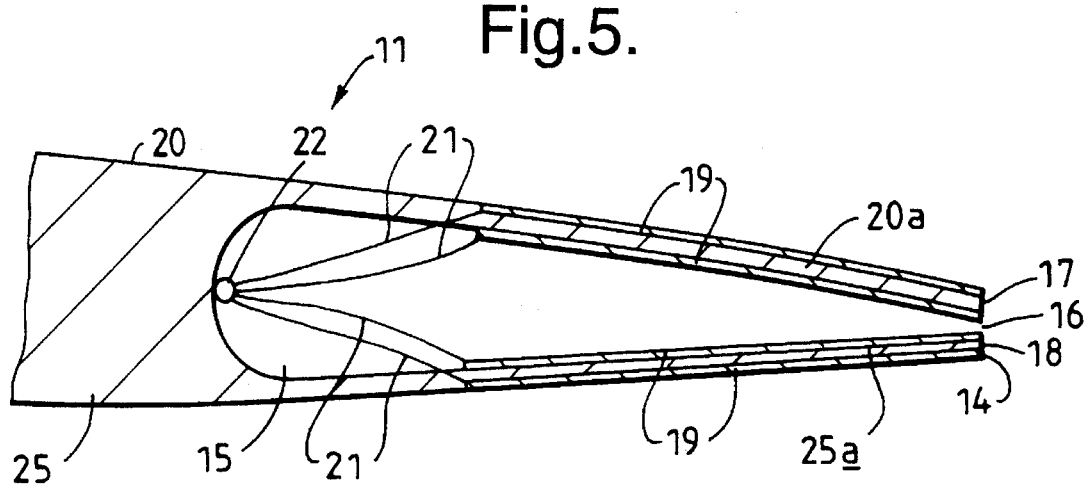
FIG. 5 is a fragmentary sectioned view similar to FIG. 4 and illustrating a yet further embodiment.

In addition to such "embedded" piezo-electric actuators 19, the embodiment of FIG. 5 has further piezo-electric actuators 19 attached internally to the surface of the wall structures 20a and 25a of chamber 15 so as to sandwich the wall structures and terminating adjacent both the upper and lower slot lips 17 and 18.

The circulation control aerofoil of this invention when applied to the rotor blades of a helicopter rotor provides accurate control of the local lift distribution throughout the span of the rotor blades to provide for efficient production of rotor thrust to maximise a thrust to power ratio and/or to provide a potential for operation at higher advance ratios providing for operation at high forward speeds. In common with prior circulation control rotors, this invention does not require blade pitch change mechanisms and their actuation means. However, this invention avoids the prior an requirement for complex, heavy and costly air distribution systems in or adjacent the rotor head, and thereby achieves further reductions of weight and cost.

The arrangement of FIG. 4, having arrays of actuators 19 on both wall structures 20a and 25a provides for a wider range of variation of the local width of the slot 16 to be achieved than is possible with the single actuator installation (either on the upper surface 20 or on the lower surface 25) of FIG. 1. More operational versatility still is provided by the arrangement of FIG. 5 which has the potential both to provide a greater operating range for the width of the slot 16 and to provide for both positive and negative lift forces to be achieved.

It will be understood that this invention can be applied to circulation control aerofoils for use other than in helicopter rotor blades, and can be used for example in fixed wings where flutter suppression and flight control by differential lift is possible.

Whilst one embodiment of the invention has been described and illustrated it will be understood that many modifications may be made without departing from the scope of the invention as defined in the appended claims. For example, whilst piezo-electric actuators are preferred because they are relatively simple, cheap and robust and are capable of high frequency response characteristics, other suitable electrically deformable actuators such as memory metal or electro-magnetic actuators may be used. In installations using a single set of actuators 19 they can be located on the lower wall structure 25a instead of the upper wall structure 20a as illustrated in FIGS. 1 to 3 inclusive. Control of the individual actuators 19 can be achieved by use of pre-programmed open loop control algorithms either additionally to or in place of the described feedback mechanism and other suitable control means such as fibre optic devices can be used. The continuous exhaust slot 16 could be replaced by individual exhaust slots longitudinally of the blade, each controlled by a dedicated actuator. The exhaust slot(s) 16 could be located other than at the trailing edge 14, for example, in an upper surface of the rotor blade 11 adjacent the trailing edge or at any other desired location. More than one exhaust slot 16 can be provided, and an additional slot 16 may be provided adjacent the leading edge 13 and controlled also as hereinbefore described. Any suitable means may be incorporated for transferring pressurised air through the rotor head into the chamber 15.

What is claimed is:

1. A circulation control aerofoil having an internal spanwise extending chamber for receiving during operation pressurised air for exhaust through at least one circulation control air exhaust slot extending spanwise along the aerofoil and having a width defined by spaced-apart slot lips, and including a plurality of actuators attached along the aerofoil structure adjacent at least one of the slot lips and wherein the actuators are constructed of electrically deformable material and control means for controlling differentially the individual actuators so as selectively to adjust the width of said air exhaust slot along the aerofoil span by controlling an electric supply to the individual actuators whereby energisation of the actuators causes local bending of the aerofoil structure to which they are attached to effect said adjustment of the width of the air exhaust slot along the aerofoil span.

2. An aerofoil as claimed in claim 1, wherein said actuators are piezo-electric actuators.

3. An aerofoil as claimed in claim 1, wherein said air exhaust slot is a continuous slot extending substantially throughout the aerofoil span.

4. An aerofoil as claimed in claim 3, wherein said actuators are located substantially side-by-side along said aerofoil structure.

5. An aerofoil as claimed in claim 1, wherein said actuators are located along one surface of said aerofoil structure.

6. An aerofoil as claimed in claim 1, wherein actuators are located on both external and internal surfaces of the aerofoil structure adjacent said slot lips.

7. A helicopter rotor blade having an internal spanwise chamber for receiving during operation pressurised air for exhaust through at least one circulation control air exhaust slot extending spanwise along the blade and having a width defined by spaced-apart slot lips, and including a plurality of piezo-electric actuators located along rotor blade structure adjacent at least one of the slot lips, and control means for controlling an electric supply to the individual actuators whereby energisation of the actuators causes local bending of the structure to differentially adjust the width of the air exhaust slot along the blade span.

* * * * *